Patented Apr. 3, 1928.

1,664,600

UNITED STATES PATENT OFFICE.

CARLETON ELLIS, OF MONTCLAIR, NEW JERSEY, ASSIGNOR TO ELLIS-FOSTER COMPANY, A CORPORATION OF NEW JERSEY.

AMYLACEOUS MOLDED PRODUCT AND PROCESS OF MAKING SAME.

No Drawing. Application filed May 13, 1926. Serial No. 108,987.

This invention relates to a molded product and to the process of making same and relates especially to molded products containing cassava starch, or starch of equivalent properties, and to the process of making molded articles from compositions containing such cassava starch, all as will be more fully hereinafter described.

The composition employed in carrying out the present invention comprises, besides cassava starch, a filling material, a fusible binder and usually a certain proportion of water or other starch-swelling constituent.

The filling material may be wood flour, ground wood, exploded wood, paper or paper pulp, linters, flock, asbestos fiber, china clay, talc, whiting, iron oxide pigments and the like.

The binder preferably is sulphur, with or without phenol-sulphur chloride resin to modify its melting point and suppress (to some extent at least) its crystalline character.

Other binders may be employed along with sulphur, e. g., rosin, ester gum, Congo resin, cumaron resin and the like.

Water preferably is employed as the starch-swelling agent and may receive additions of glucose, glycerol, glycol and the like.

Molding compositions containing cassava starch, resins, e. g. ordinary rosin, fillers and preferably some water to burst the starch granules, and optionally pitches or asphalts, waxes, glycerine, and other starches, are claimed in a copending case Ser. No. 112,177 filed May 27, 1926.

Casein, glue, cellulose sulphite waste liquor, water glass and similar adhesives may be employed along with the cassava starch. In some cases the cassava starch may be admixed with other starches.

An illustrative composition may be prepared by mixing with thorough agitation

|  | Pounds. |
| --- | --- |
| Wood flour | 690 |
| Cassava starch | 413 |
| Sulphur | 240 |
| Water | 565 |

The mixing is preferably conducted in a ball mill, or Werner Pfleiderer mixer or similar effective agitating apparatus.

To obtain the product of the present invention, a moist mixture, such as the foregoing, is charged into a heated mold and subjected to heavy pressure in a hydraulic press at a temperature above the melting point of sulphur and preferably between 150° and 200° C. On exposure to such heat and pressure for three to five minutes the binder melts and disseminates more effectively through the filter, the starch granules burst by the action of the water more or less converted to steam and thus the composition is given a flowing quality, spreading throughout the mold to yield a good molded article which is firm and fairly rigid. The action of the heat, steam and pressure is to cause thermo-setting, that is, the composition at first flows and forms into the shape of the mold, then hardens so that on removal hot from the mold, the article is not easily deformed in handling. The mold is best made in a manner such as to allow the escape of some moisture during the molding operation. This tends to give some porosity which in turn confers lightness on the finished article. Molded containers, such for example as cigar boxes, artificial lumber and so forth thus may be made of relatively low specific gravity.

Unusual strength is conferred (in molded products from compositions as herein described) by the employment of cassava starch. The latter starch, moreover, is not costly and the composition therefore may be made from inexpensive raw materials.

This application is a continuation in part and improvement upon my co-pending application, Serial No. 90,621, filed Feb. 25, 1926. The present case however embraces the use of cassava starch, which is very cheap and which experiments have shown to be particularly suitable.

From the foregoing it will be evident that the preferred form of the invention comprises as a final product, a porous thermoset molded product including a binder comprising sulphur, a filler and ruptured granules of starch, preferably cassava starch, obtained by the action of moisture under heat and pressure and further embraces the process of making molded products which comprises exposing to heat and pressure in a mold, a moist mixture of cassava starch, sulphur and a filler, say wood flour, at a temperature above the melting point of the sulphur and adequate to cause the rapid rupturing of the granules of said starch;

whereby flowing throughout the mold results, allowing steam to escape from the mold and removing the shaped article from the mold, as a substantially thermo-set product.

I have hereinabove referred to the use of cassava starch in the composition since this kind of starch is especially useful in the process. But, as pointed out in my copending application 90,621 above noted, the invention is not restricted to the use of cassava starch but starch broadly and farinaceous materials such as starch or flour may be employed in the invention. Such starch or farinaceous material is best used in the state of a powder.

What I claim is:—

1. A thermoset molded product comprising cassava starch, sulphur and a filler.

2. A thermoset porous molded product comprising cassava starch having its cells ruptured, a binder and a filler.

3. A porous thermo-set molded product comprising ruptured cassava starch granules, a binder comprising sulphur and a filler.

4. The process of making molded products which comprises exposing to heat and pressure in a mold, a moist mixture of cassava starch, sulphur and wood flour, at a temperature above the melting point of sulphur and adequate to cause the rapid rupturing of the granules of said starch; whereby flowing throughout the mold results, allowing steam to escape from the mold and removing the shaped article from the mold as a substantially thermo-set product.

5. The process of making molded products which comprises exposing to heat and pressure in a mold, a moist mixture of cassava starch, sulphur and a filler, at a temperature above the melting point of sulphur and adequate to cause the rapid rupturing of the granules of said starch; whereby flowing throughout the mold results, allowing steam to escape from the mold and removing the shaped article from the mold as a substantially thermo-set product.

6. The process of making molded products which comprises exposing to heat and pressure in a mold, a moist mixture containing cassava starch, sulphur and filler, at a temperature above the melting point of sulphur and adequate to cause the rapid rupturing of the granules of said starch; whereby flowing throughout the mold results, allowing steam to escape from the mold and removing the shaped article from the mold as a substantially thermo-set product.

7. A molding composition comprising wood flour, sulphur, starch and water having the property of setting to a firm fairly rigid product on hot pressing.

8. A container having porous walls, said walls consisting of hot pressed mixture of sulphur, wood flour, and a farinaceous material.

9. The process which comprises subjecting a moist mixture of wood flour, sulphur and starch to heat and pressure whereby a substantially thermo-rigid product is obtained.

10. The process which comprises molding an intimate mixture of wood flour, sulphur, and starch, while moist, under pressure at a temperature of about 150 to 200° C., for about three to five minutes.

CARLETON ELLIS.